(12) United States Patent
Goldhamer

(10) Patent No.: US 7,768,972 B2
(45) Date of Patent: Aug. 3, 2010

(54) METHOD AND DEVICE FOR INCORPORATING DIFFERENT PHY MODE WIRELESS COMMUNICATIONS

(75) Inventor: Mariana Goldhamer, Ramat Gan (IL)

(73) Assignee: Alvarion, Ltd., Tel-Aviv (IL)

( * ) Notice: Subject to any disclaimer, the term of this patent is extended or adjusted under 35 U.S.C. 154(b) by 592 days.

(21) Appl. No.: 11/718,625

(22) PCT Filed: Nov. 2, 2005

(86) PCT No.: PCT/IL2005/001147

§ 371 (c)(1),
(2), (4) Date: May 4, 2007

(87) PCT Pub. No.: WO2006/048873

PCT Pub. Date: May 11, 2006

(65) Prior Publication Data

US 2009/0073920 A1 Mar. 19, 2009

(30) Foreign Application Priority Data

Nov. 4, 2004 (IL) .................................... 165035

(51) Int. Cl.
*H04W 4/00* (2009.01)
(52) U.S. Cl. .................. 370/329; 370/337; 370/338
(58) Field of Classification Search ................ None
See application file for complete search history.

(56) References Cited

U.S. PATENT DOCUMENTS 7,197,022 B2 * 3/2007 Stanwood et al. ........... 370/337

2004/0037257 A1 * 2/2004 Ngo ........................... 370/338

FOREIGN PATENT DOCUMENTS

EP 1 492 269 A1 12/2004
WO 2004/019558 A1 3/2004

OTHER PUBLICATIONS

Aloush et al., "Coexistence of Fixed and Mobile Services", IEEE 802.16 Broadband Wireless Access Working Group, IEEE C802.16e-03/02, Jan. 10, 2003.
Harmonization of 2K OFDMA and 256 Sub-Channelization Runcom, ETSI BRAN # 33.5, BRAN29d044, Leuven, Belgium Aug. 12-14, 2003.
Draft IEEE Standard for Local and metropolitan area networks Part 16: Air Interface for Fixed Broadband Wireless Access Systems IEEE P802.16-REVd/D5, May 13, 2004.

* cited by examiner

*Primary Examiner*—Erika A Gary
(74) *Attorney, Agent, or Firm*—Browdy and Neimark, PLLC

(57) ABSTRACT

In a wireless communications network comprising at least two subscriber terminals each operative to communicate with the same base station using a different PHY mode transmissions than the other, a method and apparatus for allowing communications with these subscriber terminals along a single frequency communication channel is provided. The communication is carried by defining common radio transmission frames in which each of the at least two PHY modes communications is carried out while occupying a different part of the common radio transmission frames. Preferably, at least one of the PHY modes is in compliance with IEEE 802.16 Standard.

20 Claims, 2 Drawing Sheets

METHOD AND DEVICE FOR INCORPORATING DIFFERENT PHY MODE WIRELESS COMMUNICATIONS

This application is a national stage of parent application PCT/IL05/001147, filed Nov. 2, 2005, and claims priority to Israeli application no. 165035, filed Nov. 4, 2004.

FIELD OF THE INVENTION

The present invention relates generally to wireless communications, and in particular, to the use of different transmission technologies within a single wireless network.

BACKGROUND OF THE INVENTION

Wireless access technologies experience transitions from one generation to another. During these transitions, the market typically requires that both old and new technologies be supported so that users of the old technology can operate in parallel at the same network with users of the new technology. Such a requirement creates problems both to operators, who need to replicate costly infrastructure, and moreover, need to divide the frequency band which they have licensed, into one sub-band accommodating transmissions that use the old technology and another sub-hand accommodating the transmissions using the new technology. Such rigid partitioning implies inefficient utilization of the resources as the usage pattern of the technologies varies over time. From the equipment manufacturer perspective, the introduction of new technology, even if it has not yet matured, impedes the development of the existing technology due to market expectation.

An example at hand is the transition of IEEE 802.16™ from purely fixed services to combined fixed and mobile operation. The international standard includes three physical layers—referred to as PHY—Single Carrier, OFDM and OFDMA, of which, the OFDM mode has been chosen by the WiMAX forum as the technology of choice for fixed deployments. For the combined fixed and mobile mode of operation, which at present is being developed as a recommendation to be issued by the 802.16e committee, the industry perceives OFDMA technology to be the preferred technology. This preference might impede the deployment of the OFDM technology even though mobile, or combinations of fixed+mobile WiMAX systems, might still be few years away.

Solutions for such technology transition were discussed in the past. In their "Coexistence of Fixed and Mobile Services", IEEE C802.16e-03/02 (January 2003), the authors Avner Alush, Marianna Goldhammer, Vladimir Yanover, proposed a frame structure which shares the airframe between fixed and mobile services in the time domain. This proposal achieves the target of having flexible resource allocation between the fixed and mobile parts of the frame. However, the main drawback of this proposal is that the mobile sub-frame does not start at periodic intervals and each MAC frame has a duration or start time according to that announced in its preceding MAC frame—a characteristic which complicates synchronization of mobile transmissions. Moreover, the mobile subscribers are assumed to receive the "fixed" portion of the downlink, which in general is less robust than the mobile part. Another proposal "Harmonization of 2K OFDMA and 256 Sub-channalization", ETSI BRAN 33.5, Leuven, 12-14 Aug. 2003, was made by Runcom to the HIPERMAN committee and presents an idea in which both the OFDM and OFDMA frames are interleaved so that each subscriber may synchronize on the transmissions of the technology of choice while ignoring the other transmissions. The limitation of this concept is that the percentage of time, and consequently the data traffic allocated to each of the technologies, cannot be changed dynamically.

The disclosure of the references mentioned herein throughout the present specification are hereby incorporated by reference as if fully set forth herein.

SUMMARY OF THE INVENTION

It is an object of the present invention to provide a method and apparatus to enable combining IEEE 802.16-based systems, using different PHY modes and transmitting along the same communication channel.

It is another object of the present invention to provide a method and apparatus to enable flexible resources' allocations between transmissions derived while utilizing different technologies (hybrid mode).

It is still another object of the present invention to provide a method and apparatus to enable decoding of transmissions derived from a certain technology transmitter while refraining from decoding transmissions derived along the same channel from a transmitter using a different technology.

Other objects of the invention will become apparent as the description of the invention proceeds.

In accordance with a first embodiment of the present invention there is provided in a wireless communications network comprising at least one base station and a plurality of subscriber terminals associated therewith, out of which at least two of the subscriber terminals are each operative to communicate with the at least one base station using a different PHY mode communications than the other, and each of the PHY mode communications is characterized by having a corresponding frame duration, a method for allowing communications between the at least one base station and the at least two subscriber terminals along a single frequency communication channel. The method provided is carried by defining common radio transmission frames, in which each of the at least two PHY modes communications is carried out while occupying a non-overlapping part of the common radio transmission frames. Preferably, at least one of the PHY modes is in compliance with IEEE 802.16 Standard.

According to another embodiment of the invention, the part of a common radio transmission frame allocated for communications associated with one of the PHY modes is different from the part allocated for communications associated that PHY mode in at least one other common radio transmission frame.

By yet another embodiment of the invention, the radio frame durations of all PHY mode communications associated with a common radio transmission frame are equal.

In accordance with still another embodiment of the invention, the radio frame duration of at least one of the PHY mode communications in a common radio transmission frame is an integer multiple of the radio frame duration of at least one other PHY mode associated with that common radio transmission frame.

By still another embodiment, each common radio transmission frame is used in its entirety for transmitting in accordance with one of the PHY modes.

According to still another preferred embodiment of the invention, out of every N radio transmission frames, K1 common radio transmission frames are dedicated to the transmission of communications using one of the PHY modes and K2 radio transmission frames are dedicated to the transmission of communications using another of the PHY modes, wherein K1+K2 is less than or equal to N, and wherein the PHY modes arrangement within these N radio transmission frames, forms a pattern characterizing communications transmitted along that single frequency communication channel. Preferably, this pattern is repeated after N consecutive common radio transmission frames.

Preferably, the at least one of the different PHY modes can dynamically change the duration of transmission intervals during the common radio transmission frame.

By yet another preferred embodiment of the invention, a time period allocated in a common radio transmission frame for communicating with a subscriber terminal using one of the PHY modes, is different from a time period allocated for communicating with the same subscriber terminal in a proceeding (e.g. a consecutive) common radio transmission frame.

Preferably, the change in the time period allocated in a common radio transmission frame for communicating with a subscriber terminal using one of the PHY mode, is preceded by a message transmitted in at least one common radio transmission frame which precedes a common radio transmission frame at which said change is to be affected.

According to still another embodiment of the invention, the time duration of one of the PHY modes in at least one common radio transmission frame is different from the time duration of said one of the PHY modes in at least one other preceding common radio transmission frame. Preferably, a change in the time duration of a PHY mode in a common radio transmission frame, is preceded by a message transmitted in at least one common radio transmission frame which precedes a common radio transmission Frame at which that change is to be affected.

In accordance with another aspect of the invention, there is provided a base station operative in a wireless communications network which comprises a plurality of subscriber terminals, and wherein at least two of said subscriber terminals are each operative to communicate with said base station along a single frequency communication channel using a different PHY mode transmissions than the other, which base station comprises:

an interface operative to allow communication with said plurality of subscriber terminals;

at least one radio transceiver operative at least one frequency and capable of transmitting communication traffic along a single frequency communication channel to said at least two subscriber terminals operative to communicate with said base station using a different PHY mode transmissions than the other, and receive communication traffic therefrom;

at least one processor adapted to allocate time periods within radio transmission frames to be transmitted along said single frequency communication channel, and wherein each of the at least two PHY modes communications is carried out while occupying a different part of common radio transmission frames. Preferably, the base station is adapted to operate in a mobile wireless system. More preferably, the base station is further adapted to operate in a fixed wireless system.

According to another embodiment of the invention, the at least one processor of the base station is further adapted to affect changes between one common radio transmission frame and its consecutive common radio transmission frame, in time periods allocated for communicating with at least one subscriber terminal using at least one of the PHY modes. Preferably, the base station further comprising transmission means operative to incorporate a message in a radio transmission frame, indicating that a change in the time period allocated for communicating with a subscriber terminal using one of the PHY modes, is due in a proceeding common radio transmission frame.

By yet another embodiment of the invention, the at least one processor is further adapted to affect a change between a common radio transmission frame and a proceeding common radio transmission frame, wherein the change is affected in the duration of at least one of the PHY modes associated with the proceeding common radio transmission frame. Preferably, the base station further comprises transmission means operative to incorporate a message in a radio transmission frame, indicating that a change in the duration of at least one of said PHY modes.

DETAILED DESCRIPTION OF THE INVENTION

A better understanding of the present invention is obtained when the following non-limiting detailed description is considered in conjunction with the following drawings. As explained above, the present invention is concerned with setting a mixed mode operation by which a terminal operative in accordance with operation mode of 802.16-based/scheduling based system is used in conjunction with a terminal operative in accordance with the operation mode of general time-slotted systems. In other words, the present invention provides a solution for enabling combined operation of a system comprising terminals having at least two different PHY modes, by ensuring that transmissions to and from each of the different PHY mode terminals are carried out by occupying a different part of the wireless transmission frame.

In order to achieve such a mixed-mode operation, there are a number of conditions that should preferably be followed:

Same frame duration shall be used for both types of transmissions;

The down link Frame Start preambles, having a periodic transmission defined by the frame duration, shall be transmitted at a priori known points in time.

Figure 1:
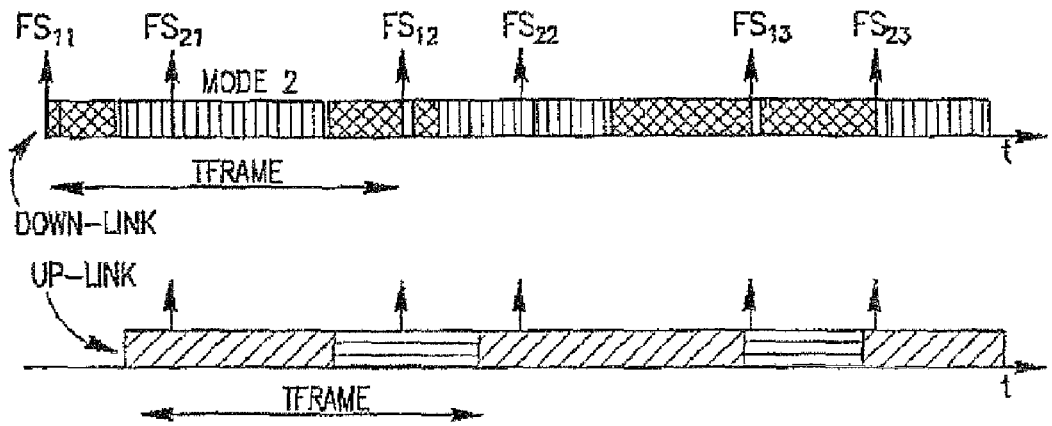
FIG. 1—presents a schematic illustration of down-link and up-link frame interleaving for FDD ("Frequency Division Duplex") mode of operation.

Following are some examples demonstrating various preferred ways of carrying out the present inventions Frame Interleaving FIG. 1 demonstrates an example of down-link and up-link frame interleaving for FDD mode of operation. The transmission of AAS (Adaptive Antenna Systems) traffic may be scheduled to be the last one in the frame.

In the upper part of FIG. 1, demonstrating the down link transmissions, are shown consecutive radio frames. For each PHY mode, the duration of the radio frame is determined by the repetition interval of the Frame Start preambles ($FS_{11}$, $FS_{12}$ and $FS_{13}$ for PHY1 and $FS_{21}$, $FS_{22}$ and $FS_{23}$ for PHY2). Furthermore, as may be seen in this example, the time period between each two consecutive Frame Starts (whether associated with mode 1 PHY or with mode 2 PHY) remains constant.

The period of time allocated for each PHY mode, and consequently, the size of every traffic domain, may be changed on a frame-per-frame basis, preferably when a common scheduler is used for both PHY modes.

The splitting between the modes in up-link may be done similarly, to enable the use of half-duplex Subscriber Stations (SS), which is characterized by having minimum up-link activity during the down-link transmissions of the same PHY and no overlapping between down-link "Frame-Start" and up-link traffic.

Figure 2:
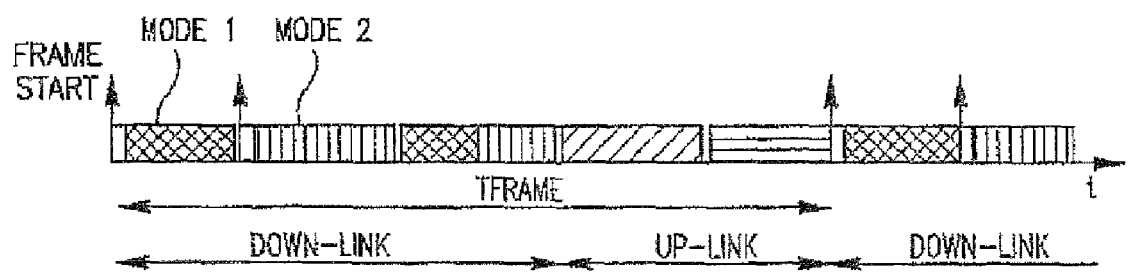
FIG. 2—illustrates a common MAC ("Media Access Control") frame for such FDD mode of operation.

The frame interleaving for TDD modes is shown in FIG. 2. The constraint to be taken into account is that due to coexistence issues, all the down-links and all the up-links should be separately grouped together.

The IEEE 802.16-2004 Standard describes the "GAP" DUIC (Downlink Interval Usage Code), for all the defined modes. During this downlink interval, the Base Station should remain silent while the subscriber terminal should not attempt to decode radio signals. During up-link transmissions, the subscriber activity is scheduled by the Base Station, so that the objective of time-sharing is achieved through appropriate scheduling.

When GAP is defined in the UIUC (up-link interval usage code), the GAP may also be used in alternative scheduling of the Subscriber Unit transmissions.

Figure 3:
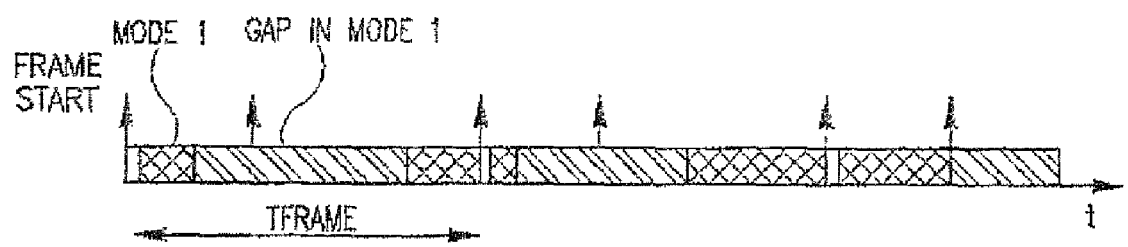
FIG. 3—illustrates the use of GAP burst profile to allow interleaving of the two PHY modes in a single MAC frame, for the FDD example.
Figure 3:
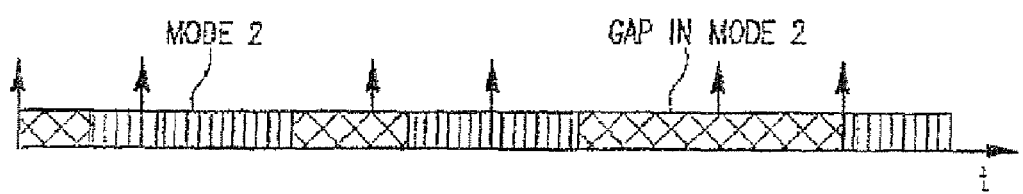

FIG. 3 illustrates the use of the GAP burst profile in order to allow the interleaving of the two modes in a single MAC frame, for the FDD example. For each of the PHY modes, during the GAP, the Base Station remains silent while the SS should not try to decode the received signals. When the transmission of the other PHY mode is due to take place, the GAP burst interval is used by the Base Station for the transmissions of the first PHY mode.

The insertion of the GAP intervals may take place at moments in which there should be a change in the down link burst type. Optimal implementation may be achieved for example, with a single scheduler and while using two PHY modes. Still, for the optimal bandwidth usage, it may be advisable to carry out fragmentation or transmissions for at least one of the modes, so that we receive two fragments in a frame, preferably before a GAP interval and at the frame end.

Frame Start Shifting

Frame start shifting may appear in a number of situations, among which are the following ones:

Skew of the frame start, due to differences in clock frequency;

No support for fragmentation in Base Station (BS) and/or reassembly in the SS; and Not enough processing power in the BS to perform fragmentation and scheduling for a high number of sub-channels.

Figure 4:
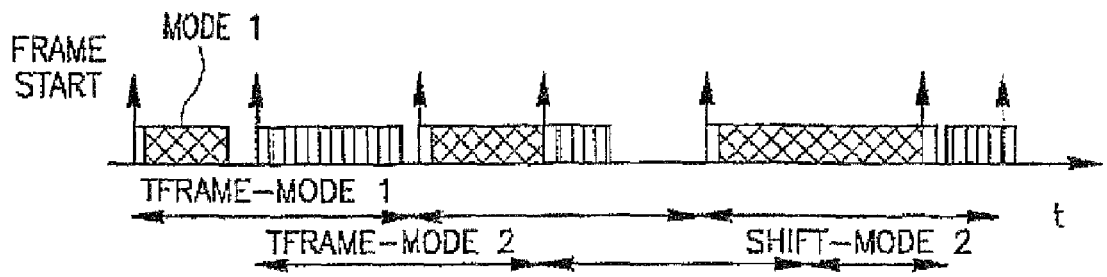
FIG. 4—illustrates another embodiment of the present invention by which the Frame Start is shifted for one of the PHYs.

In such situations, the present invention proposes an alternate mechanism allowing fully flexible and non-constrained use of available radio resources. FIG. 4 illustrates another embodiment of traffic scheduling, taking as an example the FDD case.

By this example, there is a semi-permanent time allocation for transmitting traffic in any one of the modes used and for every such mode, the scheduling is done for the "a priory" known period of time. However, due to changes which may occur if we were to consider the aggregate traffic, for example while shifting from business use (during day time) to residential use (in the evenings), a different split of the time frame would be beneficial.

This shift should preferably be done only for one of the modes used. After the shift, the activity continues using the pre-defined frame durations. In order to make the shift without loosing the connection already established with the operative subscribers, the Base Station announces, preferably by using broadcast type of transmission, the relative number of the future frame in which the shift will take place. This announcement is preferably done in every frame, out of the frames that precede the actual frame in which the change is effected. For implementing such a mechanism, hardware communication may be used between the different cards or shelves implementing the two different modes, where the communication comprises for example the transmission of the "Frame Start" signals, but without excluding possibilities for other communication forms. The non-affected PHY mode operation (mode 1 PHY in FIG. 5 will continue to have un-modified Frame Start position) will detect the new available traffic transmission periods from the timing of the "Frame Start" signals. At the same time, the subscribers operating under the mode 2 PHY are made aware of the Frame Start shifting upon receiving the messages discussed above, consequently the mode 2 PHY subscribers will communicate with the base station only during the new periods allocated for the mode 2 SHY operation. This embodiments enables to affect a change in the proportion between the periods allocated for the mode 1 PHY transmissions and the periods allocated for the mode 2 PHY transmissions (by extending or shortening the time between two consecutive Frame Start for the mode 2 PHY transmissions), which in turn has the advantage of being able to better utilize the bandwidth available.

Figure 5:
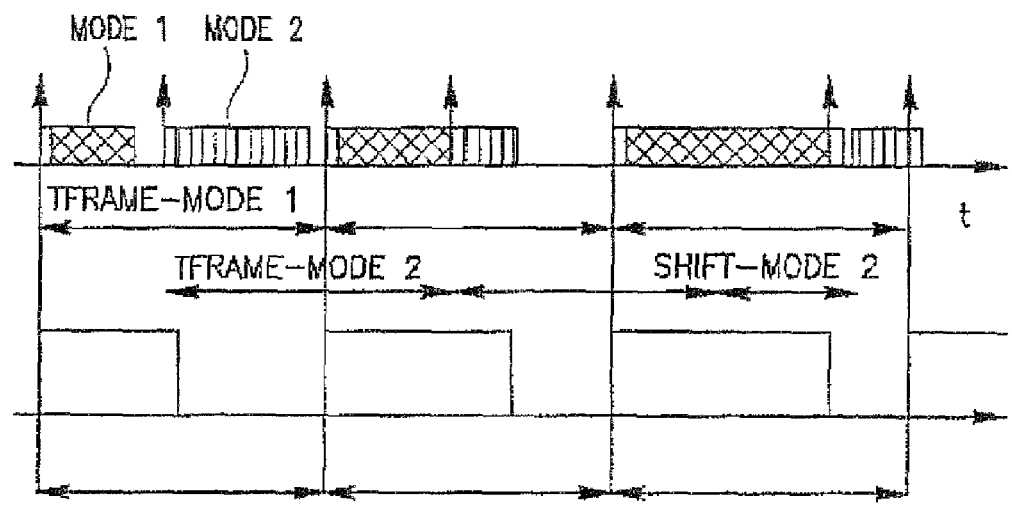
FIG. 5—exemplifies HE signaling in case of a Frame Start shift for one of the PHYs.

In FIG. 5, the frame start of the mode 1 PHY are represented by a rising edge and the frame start of mode 2 PHY are represented by a falling edge. The signal will be transmitted, for example, one frame (but may be any number of frames) before the actual frame start the shift in the mode 2 PHY.

When implementing the solution provided by the present invention, the user may decide which PHY mode is allowed to change the frame duration and generate the advanced timing signal, and which PHY mode should remain with fixed frame duration.

By another example, a different hardware signaling may be used. Each of the PHY modes has a signal that indicates the actual activity that is taking place, as a fraction of the frame duration. The decision on how to split the frame period may be taken separately, based on previously known time-splitting parameters or based on any other common rules. In order to avoid wrong allocation, one of the schedulers will preferably produce the advanced timing signaling.

Frame Alternation

The frame alternation process is adopted to allow allocating N frames to one PHY and another M frames to the other PHY.

Figure 6A:
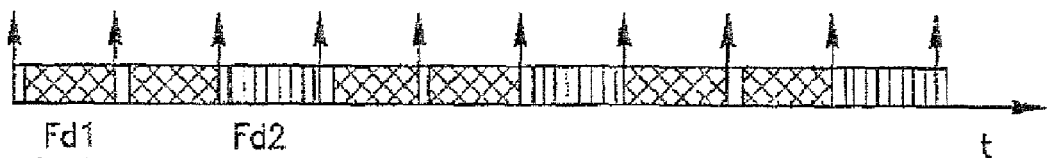
FIGS. 6A and 6B—illustrate an activity bit-map (FIG. 6A) and a change effected thereat (FIG. 6B).
Figure 6B:
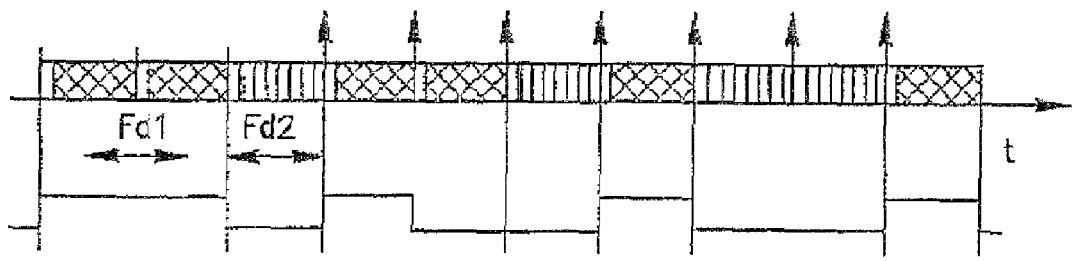

The activity fraction of the one PHY may therefore be described as: N/(N+M). FIG. 6 describes the results obtained in operating by this mode of operation.

The Mode 1 activity bit-map results to be: 11011011, while the Mode 2 activity bit-map is: 10010010. More complicated bit patterns, with low correlation properties may be defined. The bit-maps, defining the used frames, can be transmitted in a HW mode (as the signal shown in FIG. 7) exchanged between the two systems.

The bit-maps may be changed, providing a dynamic characteristic to the resources allocation between the two PHY modes. The change to be effected can be sent a number of frames (one frame, in the example demonstrated in FIG. 7) prior to the actual pattern change. A "high" level represents the mode 1 PHY, while a "low" level represents the mode 2 PHY. In addition, the "activity request" signaling may be used as well, in a way similar to that explained previously.

Communication Between the Schedulers of the Different Modes

Independent of the chosen solution, different techniques (or a combination of certain techniques) that are known in the art per se may be used in order to implement that solution, among which are:
Common scheduling;
Exchange of messages;
Hardware signaling;
Common Management System.

Mixed Operation Between 802.16/Scheduled Systems and Time-Slotted Systems

Many existing mobile systems, including IMT-2000, use time slots, mainly for the purpose of power and interference control. However, such systems may use only a part of the existing slots, while the other slots being dedicated to handle traffic associated with an IEEE 802.16 compatible PHY. Preferably, either 10 ms or 20 ms duration frames will be used, so as to satisfy the common frame duration condition described above.

It is to be understood that the above description only includes some embodiments of the invention and serves for its illustration. Numerous other ways of managing various types of compressed signals in telecommunication networks may be devised by a person skilled in the art without departing from the scope of the invention, and are thus encompassed by the present invention. Also, as will be appreciated by those skilled in the art, every such exemplified embodiment has different advantages and also applies to different implementation approaches, from combined scheduling to independent systems, using different communication procedures.

The invention claimed is:

1. In a wireless communications network comprising at least one base station and a plurality of subscriber terminals associated therewith, out of which at least two of said subscriber terminals are each operative to communicate with said at least one base station using a different physical layer mode communications than the other and wherein each of said different physical layer mode communications is characterized by having a corresponding frame duration, a method for allowing communications between said at least one base station and said at least two subscriber terminals along a single frequency communication channel, wherein said method is carried out by defining common radio transmission frames and wherein each of the at least two physical layer modes communications is carried out while occupying a non-overlapping part of the common radio transmission frames.

2. A method according to claim 1, wherein the part of a common radio transmission frame allocated for communications associated with one of the physical layer modes is different from the part allocated in said common radio transmission frame for communications associated with at least one other of the physical layer modes.

3. A method according to claim 1, wherein the part of a common radio transmission frame allocated for communications associated with one of the physical layer modes is different from the part allocated for communications associated that physical layer mode in at least one other common radio transmission frame.

4. A method according to claim 1, wherein the radio frame durations of all physical layer mode communications associated with a common radio transmission frame, are equal.

5. A method according to claim 1, wherein the radio frame duration of at least one of the physical layer mode communications in a common radio transmission frame is an integer multiple of the radio frame duration of at least one other physical layer mode associated with said common radio transmission frame.

6. A method according to claim 1, wherein at least one of said different physical layer modes can dynamically change the duration of transmission intervals during said common radio transmission frame.

7. A method according to claim 1, wherein each common radio transmission frame is used in its entirety for transmitting in accordance with one of said physical layer modes.

8. A method according to claim 7, wherein out of every N radio transmission frames, K1 common radio transmission frames are dedicated for the transmission of communications using one of the physical layer modes and K2 radio transmission frames are dedicated for the transmission of communications using another of the physical layer modes, wherein K1+K2 is less than or equal to N, and wherein the physical layer modes arrangement within said N radio transmission frames forms a pattern characterizing communications transmitted along said single frequency communication channel.

9. A method according to claim 8, wherein said pattern is repeated after N consecutive radio transmission frames.

10. A method according to claim 1, wherein a time period allocated in a common radio transmission frame for communicating with a subscriber terminal using one of the physical layer modes, is different from a time period allocated for communicating with the same subscriber terminal in a preceding common radio transmission frame.

11. A method according to claim 10, wherein a change in the time period allocated in a common radio transmission frame for communicating with a subscriber terminal using one of the physical layer modes, is preceded by a message transmitted in at least one common radio transmission frame which precedes a common radio transmission frame at which said change is to be affected.

12. A method according to claim 1, wherein the time duration of one of the physical layer modes in at least one common radio transmission frame is different from the time duration of said one of the physical layer modes in at least one other preceding common radio transmission frame.

13. A method according to claim 12, wherein a change in the time duration of a physical layer mode in a common radio transmission frame, is preceded by a message transmitted in at least one common radio transmission frame which precedes a common radio transmission frame at which said change is to be affected.

14. A base station operative in a wireless communications network which comprises a plurality of subscriber terminals, and wherein at least two of said subscriber terminals are each operative to communicate with said base station along a single frequency communication channel using a different physical layer mode transmissions transmission than the other, which base station comprises:
an interface operative to allow communication with said plurality of subscriber terminals;
at least one radio transceiver operative at least one frequency and capable of transmitting communication traffic along a single frequency communication channel to said at least two subscriber terminals operative to communicate with said base station using a different physical layer mode transmission than the other, and receive communication traffic therefrom;

at least one processor adapted to allocate time periods within radio transmission frames to be transmitted along said single frequency communication channel, and wherein each of the at least two physical layer mode transmissions is carried out while occupying a different part of common radio transmission frames.

15. A base station according to claim 14, wherein said base station is adapted to operate in a mobile wireless system.

16. A base station according to claim 15, wherein said base station is further adapted to operate in a fixed wireless system.

17. A base station according to claim 14, wherein said at least one processor is further adapted to affect changes between one common radio transmission frame and its consecutive common radio transmission frame, in time periods allocated for communicating with at least one subscriber terminal using at least one of the physical layer modes.

18. A base station according to claim 17, further comprising transmission means operative to incorporate a message in a radio transmission frame, indicating that a change in the time period allocated for communicating with a subscriber terminal using one of the physical layer modes, is due in a proceeding common radio transmission frame.

19. A base station according to claim 14, wherein said at least one processor is further adapted to affect a change between a common radio transmission frame and a preceding common radio transmission frame, wherein said change is affected in the duration of at least one of the physical layer modes associated with said proceeding common radio transmission frame.

20. A base station according to claim 19, further comprising transmission means operative to incorporate a message in a radio transmission frame, indicating that a change in the duration of at least one of said physical layer modes, is due in a proceeding common radio transmission frame.

* * * * *